US006754185B1

(12) United States Patent
Banerjee et al.

(10) Patent No.: US 6,754,185 B1
(45) Date of Patent: Jun. 22, 2004

(54) MULTI LINK LAYER TO SINGLE PHYSICAL LAYER INTERFACE IN A NODE OF A DATA COMMUNICATION SYSTEM

(75) Inventors: Subrata Banerjee, Elmhurst, NY (US); James Bernitt, Yorktown Heights, NY (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/406,649

(22) Filed: Sep. 27, 1999

(51) Int. Cl.[7] .................................................. H04B 1/44
(52) U.S. Cl. ........................ 370/282; 370/389; 370/469
(58) Field of Search ................................ 370/469, 282, 370/294, 230, 389

(56) References Cited

U.S. PATENT DOCUMENTS 6,327,637 B1 * 12/2001 Chang ........................ 710/129

FOREIGN PATENT DOCUMENTS

| EP | 0932104 A1 | 7/1999 | |
| EP | 0 932 104 A1 * | 7/1999 | ........... G06F/13/10 |
| WO | 00/36517 | 6/2000 | |

OTHER PUBLICATIONS

Diamond, Stephen L., "P1394: Good for Desktops and Portables", IEEE Micro, Apr. 1995, pp. 81–83.*
"IEEE Standard for a High Performance Serial Bus", 1996, The Institute of Electrical and Electronics Engineers, Inc.*
"TSB12LV31 Data Manual", Sep. 1998, Texas Instruments.*
"IEEE Standard for a High Performance Serial Bus", 1996, The Institute of Electrical and Electronics Engineers, Inc., pp. 50 and 160.*

Texas Instruments: "TSB12LV31 IEEE 1394–1995 General–Purpose Link Layer Controller" Data Manual, Sep. 1998, XP002167311.
Texas Instruments: "TSB12LV23 OHCI–Lynx PCI Based IEEE 1394 Host Controller" Data Manual Apr. 1999, XP002167312.
IEEE Standard, P1394 Standard for a High Performance Serial Bus, P1394 Draft 8.0V3, Oct. 16, 1995 pp. 30–31, 151–152, 154, 161–163, 345–357.
Philips Data Sheet PDI 1394P11A "3–Port Physical Layer Interface", Mar. 10, 1999.
Philips Data Sheet PDI1394L21 139X Full Duplex AV Link Layer Controller Mar. 30, 1999.
Sony Preliminary Data Sheet "CXD1947Q" pp. 1–4.
Texas Instruments Data Manual "TSB12LV31" Sep. 1998, pp. 3–2.
By S. Mazor, Kluwer AC. Handbook, "A Guide To VHDL" Publ., 1993.

* cited by examiner

*Primary Examiner*—Alpus H. Hsu
*Assistant Examiner*—Michael J. Molinari
(74) *Attorney, Agent, or Firm*—Kevin Simons

(57) ABSTRACT

In a node of a data communication system with a number of nodes, in which data communication system isochronous and asynchronous data is exchanged through a serial data bus structure, multiple link layer interface circuits are coupled to a single physical layer interface circuit. The physical layer interface circuit has an external port through which the physical layer interface circuit is connected to the serial bus structure. The physical layer interface circuit is coupled to the link layer interface circuits through bi-directional switches. A logic circuit controls the bi-directional switches and, in dependence of configuration information stored in configuration registers of the link layer interface circuits and its own programming, the logic circuit controls routing of isochronous and asynchronous data streams from the link layer interface circuits to the physical layer interface circuit, and from the physical layer interface circuit to the link layer interface circuits.

20 Claims, 4 Drawing Sheets

MULTI LINK LAYER TO SINGLE PHYSICAL LAYER INTERFACE IN A NODE OF A DATA COMMUNICATION SYSTEM

BACKGROUND OF THE INVENTION

1. Field of the Invention

The present invention relates to a data communication system in which a plurality of nodes are connected through a high performance serial bus carrying isochronous and asynchronous data packets. Such a high performance serial bus is based on the IEEE 1394 Standard, or the like. The isochronous data packets comprise digital audio or video data, or other suitable data.

2. Description of the Related Art

In the P1394 Standard for a High Performance Serial Bus, P1394 Draft 8.0v3, Oct. 16, 1995, pages 30–31, 151–152, 154, 161–163, 345–357, isochronous and asynchronous data communication is described. On pages 30, 31, 151–152, 154, and 163, message formats of isochronous and asynchronous messages are described. In annex J, on pages 345–357, an interface specification is given for internally interfacing a physical layer interface circuit to a link layer interface. In data communication systems in accordance with the IEEE 1394 Standard, through a port the physical layer interface is externally connected to a cable. The cable carries high speed isochronous data, typically digital audio or video data or other high speed data that has to be serviced in real time, and further asynchronous data that are less critical, such a remote control data from one audio or video device to another audio or video device. Examples of such audio and video devices are television sets, TV/VCR combo devices, cameras, DVDs, set-top boxes, camcorders, or the like. The physical layer interface control the timing of the link layer interface. Through configuration of the link layer interface, an isochronous data rate is set, typically rates of 100 Mbit/s, 200 Mbit/s, 400 Mbit/s, or even higher rates. For a 100 Mbit/s rate, data between the physical layer interface and the link layer interface are exchanged on a two bit parallel bus. For 200 Mbit/s and 400 Mbit/s, a four and eight bit parallel bus is applied, respectively. Depending on the driving interface, three or four basic operations are distinguished on the internal parallel bus, determined by a two bit control bus. When the physical layer interface is driving, the operations are idle, status, receive, and transmit. When the link layer interface is driving, the operations are idle, hold, and transmit. Respective operations are requested through transmission of requests on a serial request line between the physical layer interface and the link layer interface, such requests including a type of the request, the speed, a read or write. Request types include immediate control of the internal bus, or, as used for isochronous data transfer, arbitration. On page 353, a register map is described, including an address register for identifying a node of a data communication system in which the physical layer interface is included. A clock signal generated by the physical layer interface controls the timing of the isochronous data streams, such a timing typically being a period of 125 µsec. A combination of a physical and link layer interface is usually implemented in a node of the system, as a chip set of two chips. Herewith, a physical device that is externally connected to the link can transmit and receive high speed isochronous data streams to and from the high perfomance serial bus, data streams of different devices being serviced on a time sharing or time division multiplex basis.

In the Philips Data Sheet, "PDI1394P11A 3-port physical layer interface", Mar. 10, 1999, a 3-port physical layer interface chip for IEEE 1394–1395 systems is described. On page 4, interfacing is shown with a link layer interface as described in the Philips Data Sheet "PDI1394L21 1394 full duplex AV link layer controller", Mar. 30, 1999. On page 4 of the PDI1394L21 Data Sheet, coupling of the link layer interface to a two audio/video isochronous transmitter/receivers, and further to a host interface is shown. The host interface can be coupled to an external processor for configuring the interfaces.

In the PHY/LINK Interface as disclosed in the IEEE 1394, as well as in the PHY/LINK Interface as shown in said Philips' Data Sheets, servicing of isochronous data streams is limited. In a simple configuration as in according to the IEEE 1394 Standard, only a half-duplex isochronous communication of a single external source such as an audio or video device can be serviced. In the Philips PHY/LINK/AV Interface, two half-duplex isochronous data streams or one full-duplex isochronous data stream can be serviced at a time. Particularly when using PHY/LINK Interfaces in so-called Bridges bridging local IEEE 1394 sub-systems such a limitation is disadvantageous.

In the SONY Preliminary Data Sheet "CXD1947Q", an IEEE 1394 Link Layer Interface to PCI Bus Interface is disclosed, for coupling a Physical Layer Interface Circuit to a PCI Bus.

In the Handbook, "A Guide to VHDL", S. Mazor et al., Kluwer Academic Publishers, 1993, VHDL, VHSIC Hardware Description Language, Very High Speed Integrated Circuit, is described. VHDL is a tool for chip designers to implement functionality of chips, particularly logic circuitry. Logic functions are described in a High Level Language and through Compilers and Simulators, Logic Structures in Chips are implemented. Herewith, a suitable tool is provided for programming logic circuits such as FPLA, Field Programmable Logic Arrays, without the need to go through very complicated, and virtually unfeasible designs of logic circuits as with simple gate circuits.

In the Texas Instruments Data Manual "TSB12LV31", September 1998, on page 3-2 thereof, an IEEE 1394–1395 Link-Layer Controller with two Isochronous Receive Ports is disclosed, with a programmable Isochronous channel number.

SUMMARY OF THE INVENTION

It is an object of the invention to provide, in a node of a data communication system in which a plurality of nodes is coupled through a high performance serial bus structure, a physical layer and link layer interface structure in which many isochronous data streams can be serviced in an economical and flexible way.

It is another object of the invention to provide such a physical layer and link layer structure particularly suitable for implementation in an IEEE 1394 Bridge.

It is still another object of the invention to provide a means for easily configuring such a physical layer and link layer structure, in accordance with a desired distribution of isochronous and asynchronous data streams.

It is still another object of the invention to provide a addressing mechanism for addressing isochronous and synchronous data packets in such a physical layer and link layer interface structure.

In accordance with the invention, a data communication system is provided comprising:
a plurality of nodes;
a serial bus structure for serially exchanging isochronous data and asynchronous data between said nodes;

a physical layer interface circuit comprised in one of said nodes, said physical layer interface circuit comprising an external port coupled to said serial bus structure, an internal parallel data interface, and a control interface;

a plurality of link layer interface circuits comprised in said one node, each of said link layer interfaces comprising a further internal parallel data interface and a further control interface;

a plurality of bi-directional switches, at one side all of said bi-directional switches being coupled to said internal parallel data interface, and at another side each of said bi-directional switches being coupled to a respective one of said further internal parallel data interfaces; and a logic circuit comprised in said one node, said logic circuit being coupled between said control interface of said physical layer interface circuit and said further control interfaces of said plurality of link layer interfaces, said logic circuit being arranged for selectively routing isochronous data streams and asynchronous data streams from said link layer interface circuits to said physical layer interface circuit and from said physical layer interface circuit to said link layer interface circuits.

Preferably, the link layer interface circuits have external ports for full duplex data communication with external devices such as digital audio and video devices.

Preferably, the link layer interface circuits have configuration registers that are accessible by an external device such as a host controller. With such a host controller the routing of data streams through the node can be very flexibly programmed.

Preferably, the physical layer interface generates a master clock controlling periodic timing of the isochronous and asynchronous data streams.

Preferably, guaranteed periods are reserved for isochronous data traffic, and excess time for asynchronous data traffic is reserved if current isochronous data traffic is less than the reserved guaranteed period, so that data traffic resources are assigned in a flexible way and still priority is given to real time isochronous data traffic.

Preferabbly, within the node, link layer interface circuits are addressed through a globally unique identifier, one of the link layer interfaces being a master link layer interface circuit for external requesters, and the other link layer interface circuits being slaves, so that the external requesters can easily address the link layer interface circuits.

Preferable, the master link layer interface stores copies of configuration registers of the slaves at offset values so as to allow requesters to access a particular link layer interface circuit.

Preferably, asynchronous packets are provided with a unique label so as to allow external devices to access particular link layer interface circuits.

BRIEF DESCRIPTION OF THE DRAWING

Throughout the figures the same reference numerals are used for the same features.

DESCRIPTION OF THE PREFERRED EMBODIMENT

Figure 1:
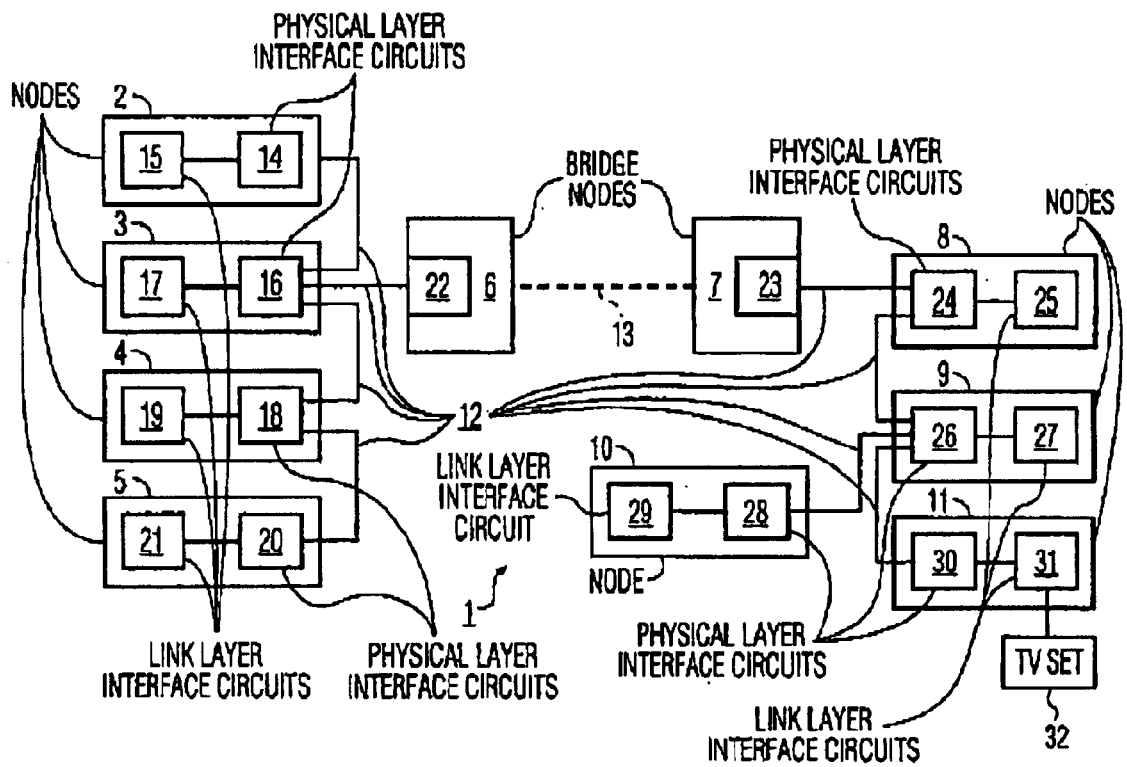
FIG. 1 schematically shows a data communication system with a plurality of nodes according to the present invention.

FIG. 1 schematically shows a data communication system 1. The data communication system 1 comprises nodes 2, 3, 4, 5, 6, 7, 8, 9, 10, and 11. In the example given, the nodes 2–11 comprise physical layer interface circuit functionality and link layer interface circuit functionality in accordance with the IEEE 1394 Standard for a High Performance Serial Bus as described in said P1394 Draft 8.0v3, Oct. 16, 1995, and further functionality according to the present invention as will be described in detail hereinafter. The nodes 2–11 are coupled to a serial bus structure 12 for serially exchanging isochronous and asynchronous data between the nodes 2–11. In accordance with the IEEE 1394 Standard, isochronous data are conveyed in channels, whereas asynchronous packets are distinguished by a source and destination address. The nodes 6 and 7 are bridge nodes coupling local IEEE 1394 bus structures through a communication link such as a remote ATM link 13. Other communication links are wired or wireless telephone links, for instance. All link layer interface circuits can be coupled to isochronous and asynchronous data streams in electronic devices including the link layer interface circuits. Such an internal coupling in an electronic device as such is well known in the art and is not part of the present invention. The node 2 is a VCR with an IEEE 1394 physical layer interface circuit 14 and an IEEE 1394 link layer interface circuit 15. The node 3 is an HDTV set with a physical layer interface circuit 16 and a link layer interface circuit 17. The node 4 is a digital speaker set with a physical layer interface circuit 18 and a link layer interface circuit 19. The node 5 is a camcorder with a physical layer interface circuit 20 and a link layer interface circuit 21. The bridge node 6 comprises a physical layer interface circuit 22, and the bridge node 7 comprises a physical layer interface circuit 23. The node 8 is a VCR with a physical layer interface circuit 24 and a link layer interface circuit 25. The node 9 is a DVD player with a physical layer interface circuit 26 and a link layer interface circuit 27. The node 10 is a digital camera with a physical layer interface circuit 28 and a link layer interface circuit 29. The node 11 is a set top box with a physical layer interface circuit 30 and a link layer interface circuit 31. The node 11 is coupled to a TV set 32. Each of the bridge nodes 6 and 7 has a number of link layer interface circuits so that several isochronous and asynchronous data streams can be conveyed through the link 13 in parallel. The nodes 2–5, and 8–11 form local IEEE 1394 sub systems, respectively. At particular instants of time, the VCR 2 transmits an isochronous data stream to the TV set 32, the DVD player 9 transmits an isochronous data stream to the TV set 3, the VCR 8 transmits an isochronous data stream to the TV set 3, and the camcorder 5 sends an isochronous data stream to the camera 10. Asynchronous control traffic may be transmitted as well. To this end, at a particular instant of time, the TV set 3 controls the VCR to stop, to fast forward, or to rewind, for instance. In the example given, device external to link layer interface circuits are digital audio and digital video devices. The present invention is not limited to such audio and video devices, but also other suitable devices may be comprised in the data communication system such as communication devices, measurement devices, or the like.

Figure 2:
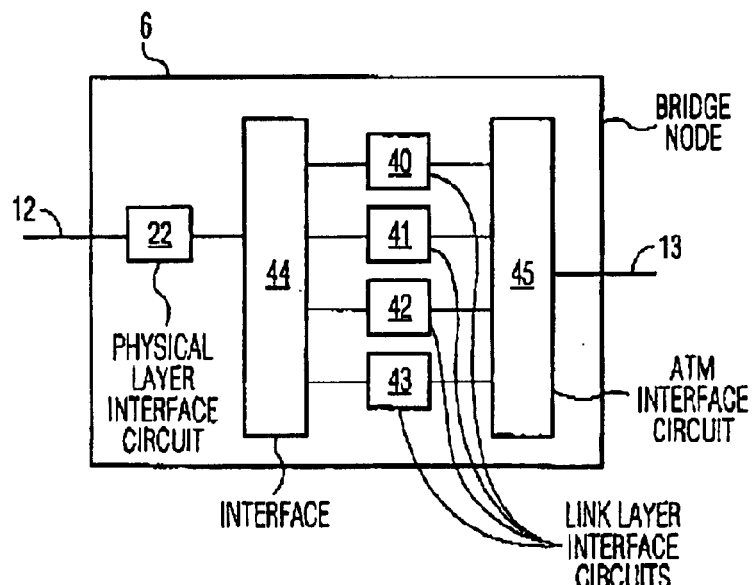
FIG. 2 schematically shows a bridge node according to the present invention.

FIG. 2 schematically shows the bridge node 6. In addition to the physical layer interface circuit 22, the bridge node 6 comprises link layer interface circuits 40, 41, 42, and 43, which are coupled to the physical layer interface circuit 22 through an interface 44. The interface 44 is configured to selectively route isochronous and asynchronous traffic from the link layer interface circuits 40–43 to the physical layer interface circuit 22, and from the physical layer interface circuit 22 to the link layer interface circuits 40–43. The bridge node 6 further comprises an ATM interface circuit 45. Through suitable addressing and packet conversion techniques, IEEE 1394 isochronous and asynchronous data packets are converted to ATM packets and properly routed to the bridge node 7 in which received ATM packets are converted to IEEE 1394 packets and are properly routed to a link layer interface circuit comprised in the bridge node 7. In the sequel, the addressing techniques will be described in more detail.

Figure 3:
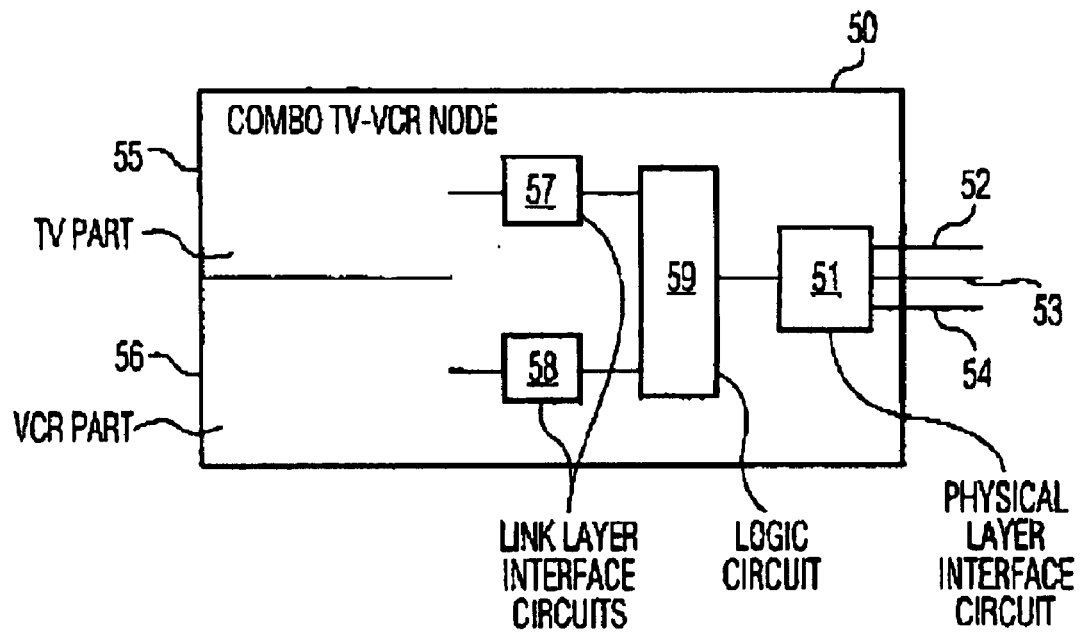
FIG. 3 shows a combo TV-VCR node according to the present invention.

FIG. 3 shows a combo TV-VCR node 50 suitable for use in the data communication system 1. The combo TV-VCR node 50 comprises a physical layer interface circuit 51 with external ports 52, 53, and 54 for coupling to the IEEE 1394 external bus structure 12. The combo TV-VCR node 50 comprises a TV part 55 and a VCR part 56, respectively coupled to link layer interface circuits 57 and 58. The link layer interface circuits 57 and 58 are coupled to the physical layer interface circuit 51 through a logic circuit 59 of a type similar to the interface 44 comprised in the bridge node 6. The combo TV-VCR node 50 is comprised in a combo TV-VCR set. In another embodiment, external devices are coupled to link layer interface circuits comprised in a node thorough external isochronous data ports, that can operate in half-duplex or in full duplex mode.

Figure 4:
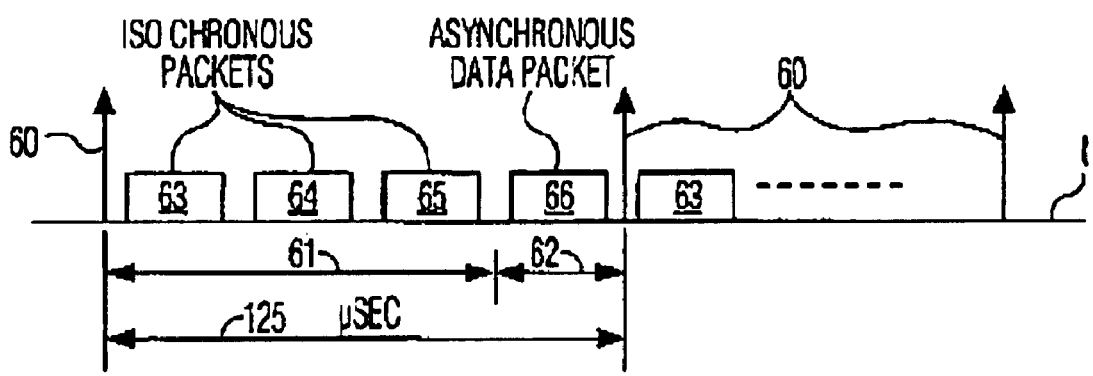
FIG. 4 shows mixed isochronous and asynchronous traffic in a data communication system according to the present invention.

FIG. 4 shows mixed isochronous and asynchronous traffic on the bus structure 12 of the data communication system 1, as a function of time t. The traffic is controlled by a master clock signal 60, with a period of 125 μsec. Within such a period of 125 μsec, a guaranteed time portion 61, e.g. 100 μsec, is reserved for isochronous data streams. A remaining time portion 62 is intended for asynchronous traffic. If current isochronous data streams require less than the guaranteed time portion 61, a time portion for asynchronous traffic can be dynamically increased in excess to the remaining time portion 62. Shown are isochronous packets 63, 64, and 65, and an asynchronous data packet 66.

Figure 5:
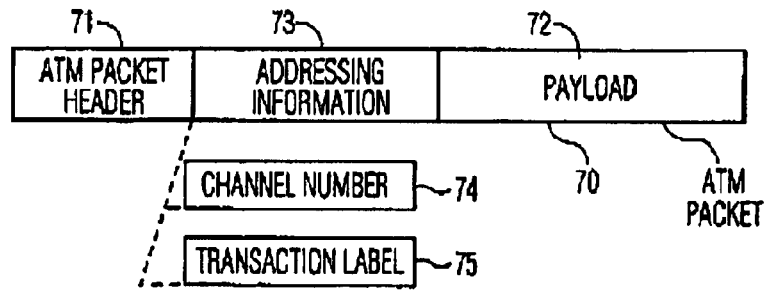
FIG. 5 shows an ATM packet transmitting isochronous or asynchronous data packets in a data communication system according to the present invention.

FIG. 5 shows an ATM packet 70 transmitting isochronous or asynchronous data packets in the data communication system 1. The ATM packet 70 is conveyed through the ATM link 13. In addition to an ATM packet header 71 and a payload 72 in the form of data to be conveyed, the ATM packet contains addressing information 73 to distinguish link layer interface circuits comprised in the bridge node 6. If the ATM packet 70 is a packet conveying isochronous data, the addressing information is a channel number 74. If the ATM packet 70 is a packet conveying asynchronous data, the addressing information is a so-called transaction label 75 as defined in said P1394 Standard, on page 151 thereof. Because in a multi link layer interface circuit node according to the present invention all link layer interface circuits have the same node address, mutually exclusive transaction label are used to distinguish the respective link layer interface circuits within the node. In IEEE 1394, the six bit transaction label address space comprises sixty four distinct digital numbers which are partitioned among the link layer interface circuits comprised in the node.

Figure 6:
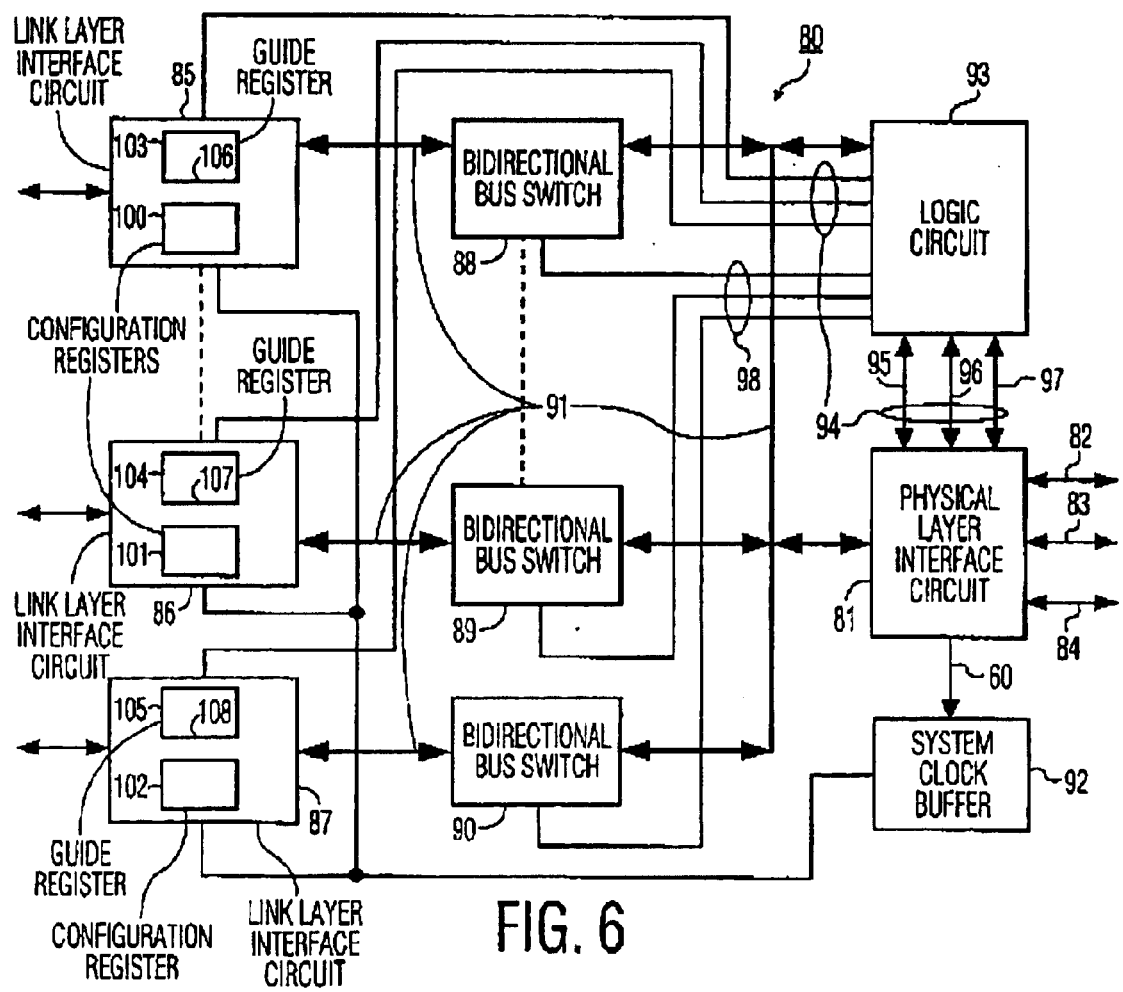
FIG. 6 shows physical layer and link layer circuitry according to the present invention, for use in a node of a data communication system.

FIG. 6 shows physical layer and link layer circuitry 80, for use in a node of the data communication system 1, such as the bridge nodes 6 and 7, or the combo TV-VCR node 50. The circuitry 80 comprises an IEEE 1394 physical layer interface circuit 81 with three external ports 82, 83 and 84 for coupling to the IEEE 1394 serial bus structure 12, and a number of IEEE 1394 link layer interface circuits 85, 86, and 87. With a dashed line between the link layer interface circuits 85 and 86 it is indicated that the number of link layer interface circuits is scalable, i.e., depending on a particular configuration of external devices to be coupled to the serial bus structure 12 and thus depending on the need for isochronous channels, the number of link layer interface circuits is chosen accordingly. The circuitry 80 further comprises bi-directional bus switches 88, 89, and 90 for coupling the respective link layer interface circuits 85, 86, and 87 to the physical layer interface circuit 81. In the example given, an eight bit internal data bus 91 is used to convey data between the link layer interface circuits 85, 86, and 87, and the physical layer interface circuit 81. For a data rate of 100 Mbit/s, two lines of the bus are used, and for data rates of 200 Mbit/s and 400 Mbit/s, four and eight bus lines are used, respectively. The circuitry 80 further comprises a system clock buffer 92 for buffering the master clock signal 60 shown in FIG. 4 and generated by the physical layer interface circuit 81. The system clock buffer 92 is coupled to the link layer interface circuits 85, 86, and 87 so that the master clock signal 60 controls the timing of the link layer interface circuits 85, 86, and 87. The circuitry 80 still further comprises a logic circuit 93. The logic circuit 93 is coupled to a control bus or interface comprising a first control line 95 and a second control line 96, and further a link request line 97. In IEEE 1394 terminology, as described on pages 345–357 of said P1394 Standard, particularly pages 345–347, the control lines 95 and 96 define four operations. When the physical layer interface circuit 81 is driving the internal bus 91, the operations are Idle, Status, Receive, and Transmit, indicating an inactive bus, sending of status information, transferring of an incoming data packet, or sending of a packet. When a link layer interface circuit is driving the internal bus 91, the operations are Idle, Hold, or Transmit, the fourth operation being unused, indicating transmission complete and release bus, holding the bus by the link, and sending of a packet by a link. The logic circuit 93 controls the bi-directional switches 88, 89, and 89 through a bus 98 of enable/disable signals. The link layer interface circuits 85, 86, and 87 comprise respective configuration registers 100, 101, and 102, and further respective registers 103, 104, and 105 for storing respective global unique identifiers 106, 107, and 108 for globally distinguishing the link layer interface circuits 85, 86, and 87. The configuration registers store current configuration information of a link layer interface circuit in a form such as described on page 3-2 of said Texas Instruments Data Manual "TSB12LV31", describing a two isochronous channel link layer interface circuit, such as the channel numbers of the isochronous channels. On the basis of globally unique identifier values, the logic circuit 93 is programmed to assign one of the link layer interface circuits 85, 86, and 87 as a master link layer interface circuit, and the remaining link layer interface circuits as slave link layer interface circuits. In an embodiment, the link layer interface circuit with the largest globally unique identifier value becomes the master. With this master/slave and globally unique identifier principle, read/write/lock asynchronous requests for a multi link layer interface circuit node can be handled. In a direction of a physical link layer interface circuit to link layer interface circuits in a multi link layer interface circuit node, a request from an external node is directed to the master. To this end, the physical layer interface circuit asserts a Receive mode on the control lines 95 and 96 until the last symbol of the requester's packet is transferred. Upon detecting Receive mode on the control lines 95 and 96, the logic circuit 93 enables all the bi-directional switched 88, 89, and 90 so that the requester's packet is transmitted to all the link layer interface circuits 85, 86, and 87. Through proper configuration, particular links can be configured to discard all asynchronous packets, or to accept isochronous packets on predetermined channels. So, one link layer interface circuit could filter isochronous packets at channels zero and one, while another link layer interface circuit filters isochronous packets at channels six and twenty two, for instance. In another example, a link layer interface circuit could be configured not to accept any serial packet from the serial bus structure 12, or to only be able to transmit isochronous packets. The master responds to the requesting node by providing a special globally unique value indicating that the node is a multi link layer interface circuit node, and by providing the number of link layer interface circuits present in the multi node. The master further stores copies of the configuration registers of the slaves at an offset value so that the requesting node can address a specific node using the offset value. The address sent to the requesting node is a destination identifier that is identical for all link layer interface circuits in the multi node, and a destination offset value distinguishing a particular link layer interface circuit in the multi node.

Instead of using offset values, direct addressing can be done. First, the master informs the requester, through the specific globally unique identifier that the node is a multi node, and informs the requester about the number of link layer interface circuits comprised in the multi node. Then, the requesting node polls the link layer interface circuits in the multi node to find out which one of the link layer interface circuits is the desired one. With each response, e.g. with eight link layer interface circuits, a three bit link layer interface circuit identifier is provided to the requesting node. Upon polling, the requesting external node uses the identifier of the desired link layer interface circuit to directly address the desired link layer interface circuit.

In a direction from the multi node link layer interface circuits to the physical layer interface circuit, the described transaction labels are used to distinguish a transaction initiated by a particular link layer interface circuit in the multi node. E.g., a VCR using the particular link layer interface circuit sends a request to a TV set to inquire whether the TV set is free. The TV set responds using the transaction label of the particular link layer interface circuit.

As an example of a request from an external node, the VCR 8 wants to send an isochronous data stream to the HDTV 3. HDTV 3 is currently configured on isochronous channel eleven at link layer interface circuit 40. First, the VCR 8 submits a read request to read the configuration register of the HDTV as stored in the circuit 40 that is of a type as shown in FIG. 6. After reading, when it receives a HDTV Idle response, the VCR 8 submits a lock request to make a reservation for the HDTV 3. If granted, the VCR 8 is locked on channel 11 so that another device cannot compete with the VCR anymore. Thereafter, the VCR 8 starts to write on channel eleven to submit its isochronous data stream to the HDTV 3. In the example, the addressing techniques are used as described before.

For a link layer interface circuits to physical layer interface communication, a request from a single requester and multiple requesters are distinguished. In said P1394 Standard, seven types of requests are defined. See the. P1394 Standard, Table 5.12. In case of a single requester, the logic circuit 93 asserts an enable signal to the bi-directional switch coupled to the single requester, and disable signals to the other bi-directional switches. In case of multiple requests, the control logic 93 stores all requests and forwards the stored requests to the physical layer interface circuit of the multi node in a round robin order. The logic circuit 93 may be programmed to discard queued requests of which a waiting time exceeds a predetermined waiting time. If desirable, a priority scheme is applied to the round robin mechanism. As an example, the link layer interface circuit 85 is currently transmitting a packet to the physical layer interface circuit 81. The link layer interface circuit 87 also wants to transmit a packet to the physical layer interface circuit 81. When the link layer interface circuit 87 sees that the control bus 94 is in Idle mode, it transmits a bus request to the physical layer interface circuit 81. The bus request is intercepted by the logic circuit 93. When at the physical layer interface circuit side the control lines 95 and 96 of the control bus 94 adopt a state that allows submission of the intercepted request, the logic circuit 93 serially transmits the intercepted bus request on the link request line 97 of the control bus 94. At its side of the control bus 94, the link layer interface circuit 87 monitors the control bus 94 and waits for a bus grant from the physical layer interface circuit 81. If it takes too long for a bus grant to get to the link layer interface circuit 87, the link layer interface circuit times out and resubmits the bus request.

The described, implied, or prior art functionality of the logic circuit 93 is implemented through the use of a VHDL language for designing logic circuits. Herewith, a logic circuit such as a field programmable gate array is designed and implemented. Those skilled in the art, once the functions of the logic circuit 93 to be carried out are described, will be able to implement the logic circuit 93 without undue experimentation, using a method such as the VHDL language to design logic circuits.

Figure 7:
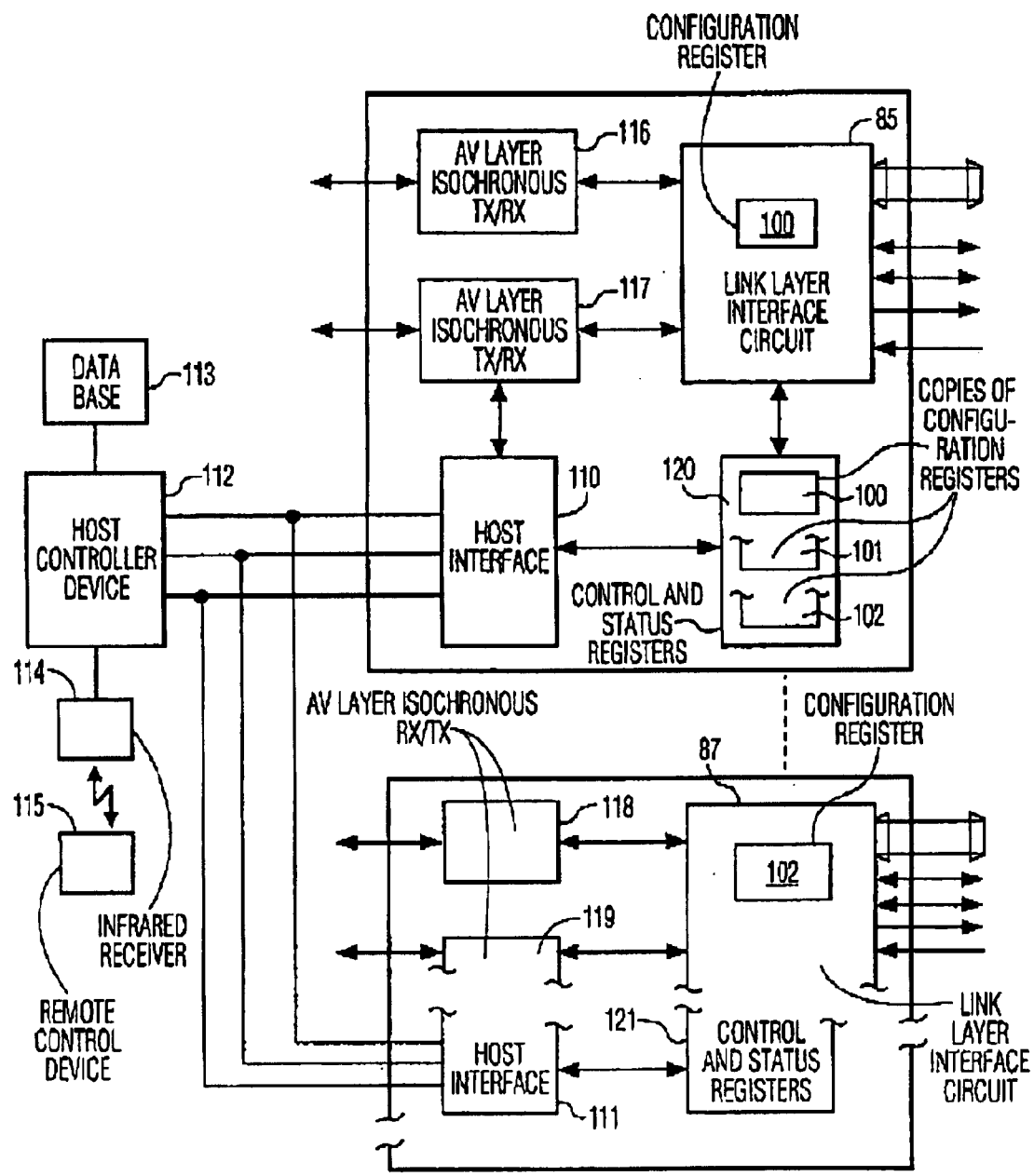
FIG. 7 shows host interface circuitry for controlling link

FIG. 7 shows host interface circuitry for controlling link layer circuits. In the embodiment given, the link layer interface circuits 85 and 87 shown comprise respective host interfaces 110 and 111 for coupling the link layer interface circuits 85 and 87 to a host controller device 112 that can be comprised in a TV set, for instance. Through the host controller device 112, the configuration registers 100 and 102 can be programmed. The host controller device 112 comprises a data base 113 for storing available and free isochonous channels, and an infrared receiver 114 for receiving information from a remote control device 115. With the remote control device 115 channels are selectable. Based on a particular selection, the data base 113 and the configuration registers 100 and 102 are updated. Further shown are audio video layer isochronous transmitter/receivers 116, 117, 118, and 119 for interfacing to audio video data streams of external devices, and control and status registers 120 and 121, as described on page 4 of said Philips PDI1394L21 Data Sheet.

In view of the foregoing it will be evident to a person skilled in the art that various modifications may be made within the spirit and the scope of the invention as hereinafter defined by the appended claims and that the invention is thus not limited to the examples provided. The word "comprising" does not exclude the presence of other elements or steps than those listed in a claim.

What is claimed is:

1. A data communication system comprising:
    a plurality of nodes;
    a serial bus structure for serially exchanging isochronous data and asynchronous data between said nodes;

a physical layer interface circuit comprised in one of said nodes, said physical layer interface circuit comprising an external port coupled to said serial bus structure, an internal parallel data interface, and a control interface;

a plurality of link layer interface circuits comprised in said one node, each of said link layer interface circuits comprising a further internal parallel data interface and a further control interface, the plurality of link layer interface circuits sharing a same globally unique network address associated with said one node;

a plurality of bi-direction switches, at one side all of said bi-directional switches being coupled to said internal parallel data interface, and at another side each of said bi-directional switches being coupled to a respective one of said further internal parallel data interfaces;

a logic circuit comprised in said one node, said logic circuit being coupled between said control interface of said physical layer interface circuit an said further control interfaces of said plurality of link layer interfaces, said logic circuit being arranged for selectively routing isochronous data streams and asynchronous data streams from said link layer interface circuits to said physical layer interface circuit and from said physical layer interface circuit to said link layer interface circuits;

wherein for outgoing data streams initiated by said link layer interface circuits, each link layer interface circuit is configured to include a unique channel or transaction label in said outgoing data streams that uniquely identifies said link layer interface circuit within said one node, and said physical layer interface circuit is configured to address said outgoing data streams using said same globally unique network address associated with said one node; and wherein for each response to said outgoing data streams that is addressed to said globally unique network address associated with said one node and that includes said unique channel or transaction label in said response, said physical layer interface circuit configured to route said response to the initiating link layer interface circuit using said label.

2. A data communication system as claimed in claim 1, wherein each of said link layer interface circuits comprises at least one external isochronous data port for coupling to external devices that are external to said one node.

3. A data communication device as claimed in claim 2, wherein said at least one external isochronous data port operates in a full duplex mode.

4. A data communication system as claimed in claim 2, wherein said external devices are digital audio or digital video devices.

5. A data communication system as claimed in claim 1, wherein said link layer interface circuits comprise respective configuration registers for configuring said link layer interface circuits, and external host interfaces for coupling to a host controller device, said host controller device being configured to control said selective routing by providing routing control information for storage in said configuration registers.

6. A data communication system as claimed in claim 5, wherein through said configuration registers a bit rate of said asynchronous data streams is selectable from a selection of 100 Mbit/s, 200 Mbit/s, and 400 Mbit/s.

7. A data communication device as claimed in claim 1, wherein said physical layer interface circuit comprises clock generation means for generating a master clock signal, said master clock signal controlling a master timing of said isochronous and said asynchronous data streams.

8. A data communication system as claimed in claim 7, wherein within a period of said master timing a guaranteed time portion is reserved for said isochronous data streams.

9. A data communication system as claimed in claim 8, wherein a time portion for asynchronous data streams is dynamically increased in excess to a remaining time portion within said period if current isochronous data streams require less than said guaranteed time portion.

10. A data communication system as claimed in claim 1, comprising a requesting node requesting a service from said one node, wherein one of said link layer interface circuits of said one node is configured to be a master link layer interface circuit and to store a globally unique identifier that is globally unique among said nodes of said system, and the other link layer interface circuits of said one node are configured to be slave link layer interface circuits, said master link layer interface circuit being configured to respond to said requesting node by providing said globally unique identifier in a response message.

11. A data communication system as claimed in claim 10, wherein said master link layer interface circuit is configured to store configuration registers of itself and said slave link layer interface circuits at offset values, so as to allow said requesting node to address a predetermined one of said link layer interface circuits in said one node through said offset values.

12. A data communication system as claimed in claim 1, wherein a responding node is configured to include said unique channel or transaction label in a response message.

13. A data communication system as claimed in claim 1, wherein for a multiple request communication from said link layer interface circuit to said physical layer interface circuit, said logic circuit is configured to serve said multiple request communication based on a round-robin mechanism.

14. A data communication system as claimed in claim 13, wherein said logic circuit is configured to apply a priority scheme to said round-robin mechanism.

15. A data communication system as claimed in claim 13, wherein said logic circuit is configured to ignore a request from a link layer interface circuit if said request cannot be serviced within a predetermined period of time.

16. A data communication system as claimed in claim 1, said system being based on the IEEE 1394 Standard.

17. In a data communication system with a plurality of nodes and a serial bus structure for serially exchanging isochronous data and asynchronous data between said nodes, a node comprising:

a physical layer interface circuit, said physical layer interface circuit comprising an external port for coupling said physical layer interface to said serial bus structure, an internal parallel data interface, and a control interface;

a plurality of link layer interface circuits, each of said link layer interface circuits comprising a further internal parallel data interface and a further control interface, the plurality of link layer interface circuits sharing a same globally unique network address associated with said node;

a plurality of bi-directional switches, at one side all of said bi-directional switches being coupled to said internal parallel data interface, and at another side each of said bi-directional switches being coupled to a respective one of said further internal parallel data interfaces;

a logic circuit that is coupled between said control interface of said physical layer interface circuit and said further control interfaces of said plurality of link layer interfaces, said logic circuit being arranged for selectively routing isochronous data streams and asynchronous data streams from said link layer interface circuits to said physical layer interface circuit and from said physical layer interface circuit to said link layer interface circuits;

wherein for outgoing data streams initiated by said link layer interface circuits, each link layer interface circuit is configured to include a unique channel or transaction label in said outgoing data streams that uniquely identifies said link layer interface circuit within said one node, and said physical layer interface circuit is configured to address said outgoing data streams using said same globally unique network address associated with said one node; and wherein for each response to said outgoing data streams that is addressed to said globally unique network address associated with said one node and that includes said unique channel or transaction label in said response, said physical layer interface circuit is configured to route said response to the initiating link layer interface circuit using said label.

18. A node as claimed in claim 17, said node being a bridge for bridging sub-systems of further nodes.

19. A node as claimed in claim 18, wherein said sub-systems are local systems and said bridging is remote bridging.

20. A node as claimed in claim 17, wherein said system is a system based on the IEEE 1394 Standard.

* * * * *